May 5, 1959  M. D. LAWRENCE  2,884,714
EDUCATIONAL DEVICE FOR TEACHING SPELLING AND ARITHMETIC
Filed Aug. 30, 1954  3 Sheets—Sheet 1
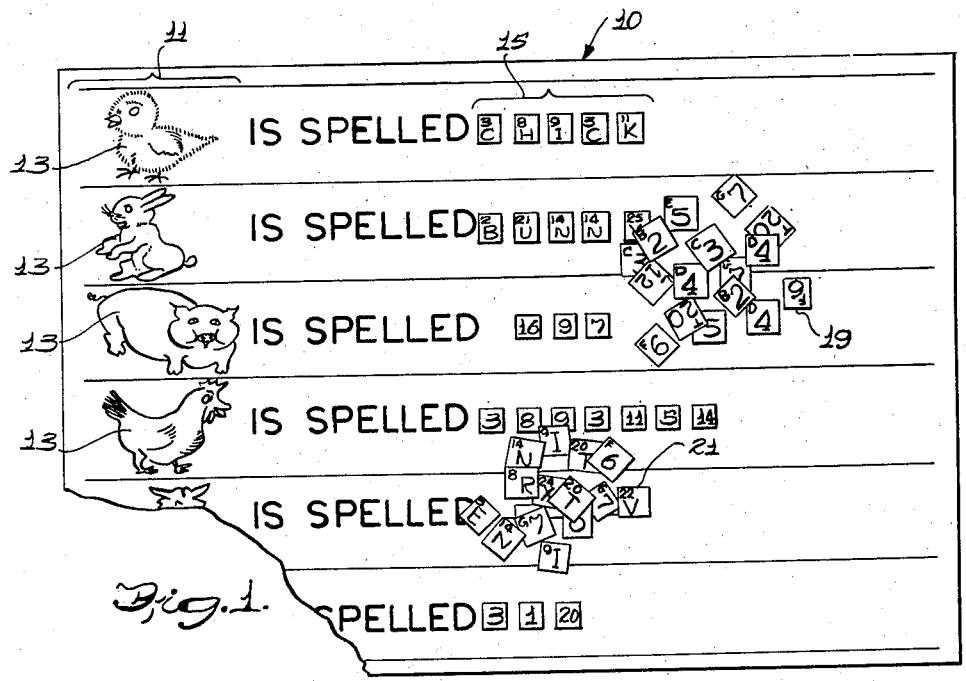
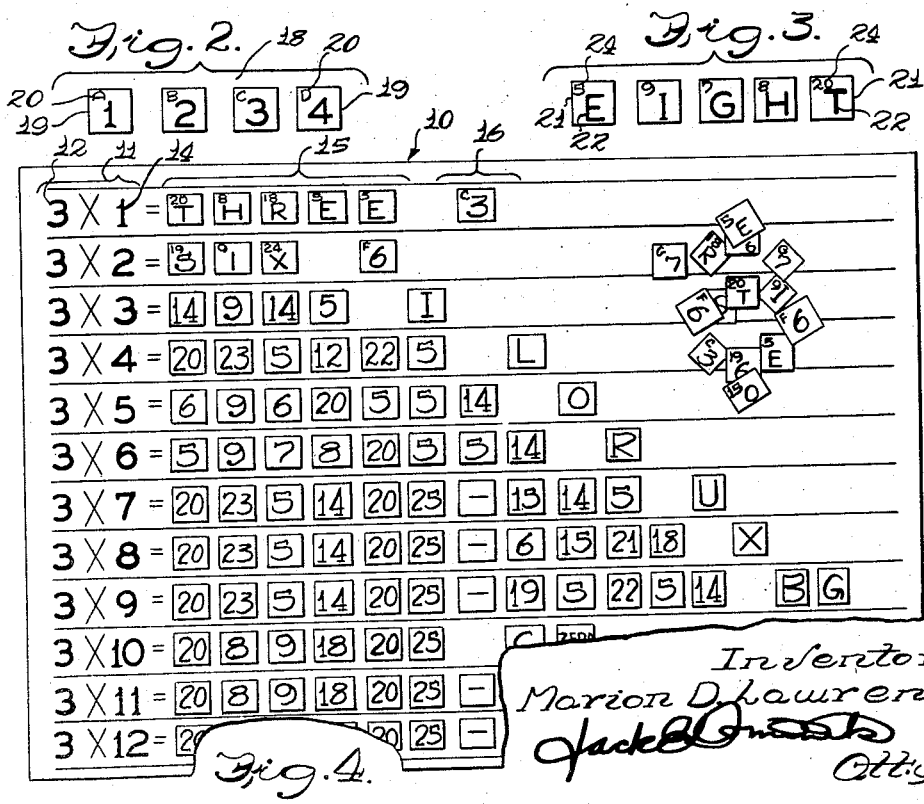
Inventor
Marion D. Lawrence
Atty May 5, 1959 — M. D. LAWRENCE — 2,884,714
EDUCATIONAL DEVICE FOR TEACHING SPELLING AND ARITHMETIC
Filed Aug. 30, 1954 — 3 Sheets-Sheet 2

Inventor
Marion D. Lawrence
Attorney

May 5, 1959   M. D. LAWRENCE   2,884,714
EDUCATIONAL DEVICE FOR TEACHING SPELLING AND ARITHMETIC
Filed Aug. 30, 1954   3 Sheets-Sheet 3

Fig. 7.

| | | | | | | |
|---|---|---|---|---|---|---|
| 1÷1= | O | N | E | | A 1 | |
| 2÷2= | O | N | E | | A 1 | |
| 4÷2= | T | W | O | | B 2 | |
| 6÷2= | 20 | 8 | 18 | 5 5 | C | |
| 8÷2= | 6 | 19 | 21 | 18 | D | |
| 10÷2= | 6 | 9 | 22 | 5 | E | |
| 12÷2= | 19 | 9 | 24 | | | |

Fig. 8.

| | | | | | | |
|---|---|---|---|---|---|---|
| 4+0= | F | O | U | R | D 4 | |
| 4+1= | F | I | V | E | E 5 | |
| 4+2= | S | I | X | | F 6 | |
| 4+3= | 19 | 5 | 22 | 5 14 | G | |
| 4+4= | 5 | 9 | 7 | 8 20 | H | |
| 4+5= | 14 | 9 | 14 | 5 | I | |
| 4+6= | 20 | | | | | |

| | | | | | | |
|---|---|---|---|---|---|---|
| 12-0= | T | W | E | L V E | 12 | |
| 12-1= | E | L | E | V E N | 11 | |
| 12-2= | T | E | N | | 10 | |
| 12-3= | 14 | 9 | 14 | 5 | I | |
| 12-4= | 5 | 9 | 7 | 8 20 | H | |
| 12-5= | 19 | 5 | 22 | 5 14 | G | |
| 12-6= | 19 | 9 | 24 | | | |

Fig. 9.

Inventor
Marion D. Lawrence
Jack E. Dominik
Attorney

United States Patent Office 2,884,714
Patented May 5, 1959

2,884,714

EDUCATIONAL DEVICE FOR TEACHING SPELLING AND ARITHMETIC

Marion D. Lawrence, Highland Park, Ill.

Application August 30, 1954, Serial No. 452,844

3 Claims. (Cl. 35—31)

The present invention relates to educational devices, and particularly an educational game to be used principally by children of grammar school age.

The general object of this invention is to teach children the mathematical series, as well as the spelling of words and numbers, by furnishing them with a game involving both.

An additional object of the present invention is to furnish a means which will stimulate the interest of a backward child in arithmetic and spelling which will not embarrass him by making public his deficiency.

A further object of this invention is to provide a self-teaching game for tutoring a child in the mathematics which requires a minimum of supervision, and may be readily used by the child at home.

Yet another object of the invention is to provide a mathematical and spelling game for children which can be played by one child, or in competition by several children.

Still another object of this invention is to teach the child playing the game the numerical position of each letter in the alphabet.

Further objects and advantages of the invention will become apparent as the following description proceeds, taken in connection with the accompanying drawings, in which:

Figure 1 is a plan view of a spelling card showing a random scattering of number and letter blocks.

Fig. 2 shows in plan view the indicia on the faces of the numbered blocks.

Fig. 3 shows in plan view the indicia on the face of the lettered blocks.

Fig. 4 shows the multiplication table of 3, partially worked out in the first two lines, and a scattering of letter and number blocks.

Fig. 5 shows the multiplication table of 8 with the first two problems spelled out.

Fig. 6 shows the multiplication table of 12 with the multiplications of 12×6 and 12×7 spelled out.

Fig. 7 is a plan view of a division card for the divisions by the number 2.

Fig. 8 is a plan view of an addition card for the additions to the number 4.

Fig. 9 is a plan view of a subtraction card for the subtractions from the number 12.

A very young child, of pre-school or early grammar school age, will be familiar with many objects and recognize them by sight or picture. He will also begin to recognize numbers. At this stage he is ready to begin using the spelling board 10 such as illustrated in Figure 1. The spelling board has two principal elements, the problem column 11, and the answer column 15. The problem column on the spelling board is composed of pictures 13 of objects which the child should recognize. In the present instance common barnyard animals and poultry are shown.

The answer column contains several numbered answer stations 15. When the child covers each numbered answer station with a lettered playing block, as will be described in greater detail below, each of the objects will be named and correctly spelled by the lettered blocks.

In broad outline, the invention contemplates teaching various word spellings mathematical problem series by means of unique printed indicia on playing boards and playing blocks. The embodiment illustrated is adapted to the multiplication tables which appear as printed indicia on playing boards 10. The lettered and numbered playing blocks 21, 19 are keyed to the answer stations 15 on the playing boards 10. As the game is played by a child, he covers the keyed answer stations with the appropriate blocks, and the answer to the mathematical problem or naming an object is spelled out. In the case of mathematical problems, the answer also appears in numerical form. The following description illustrates the use of the invention in teaching the spelling of objects, working out many arithmetical series, and learning the sequential and numerical order of the alphabet letters.

A particularly difficult learning task for children is often experienced with the multiplication tables. The present invention is adaptable as a teaching aid in this instance also.

Referring now to Fig. 4, a multiplication table board 10 for the multiplication of three is shown. The board may be made of cardboard, or wood, or any other material presenting a large plane surface which is susceptible of bearing printed indicia. The size and the color of the cards is a matter to be determined by the manufacturer, and in accordance with the particular eye appeal which is desired for the product. The various stations where the multiplication problems are to be worked out may be recessed, or horizontal racks may be provided beneath each problem. If desired, small magnetic stations may be buried in the board 10 to hold the various playing blocks as the problem is solved.

Figures 5, 6:
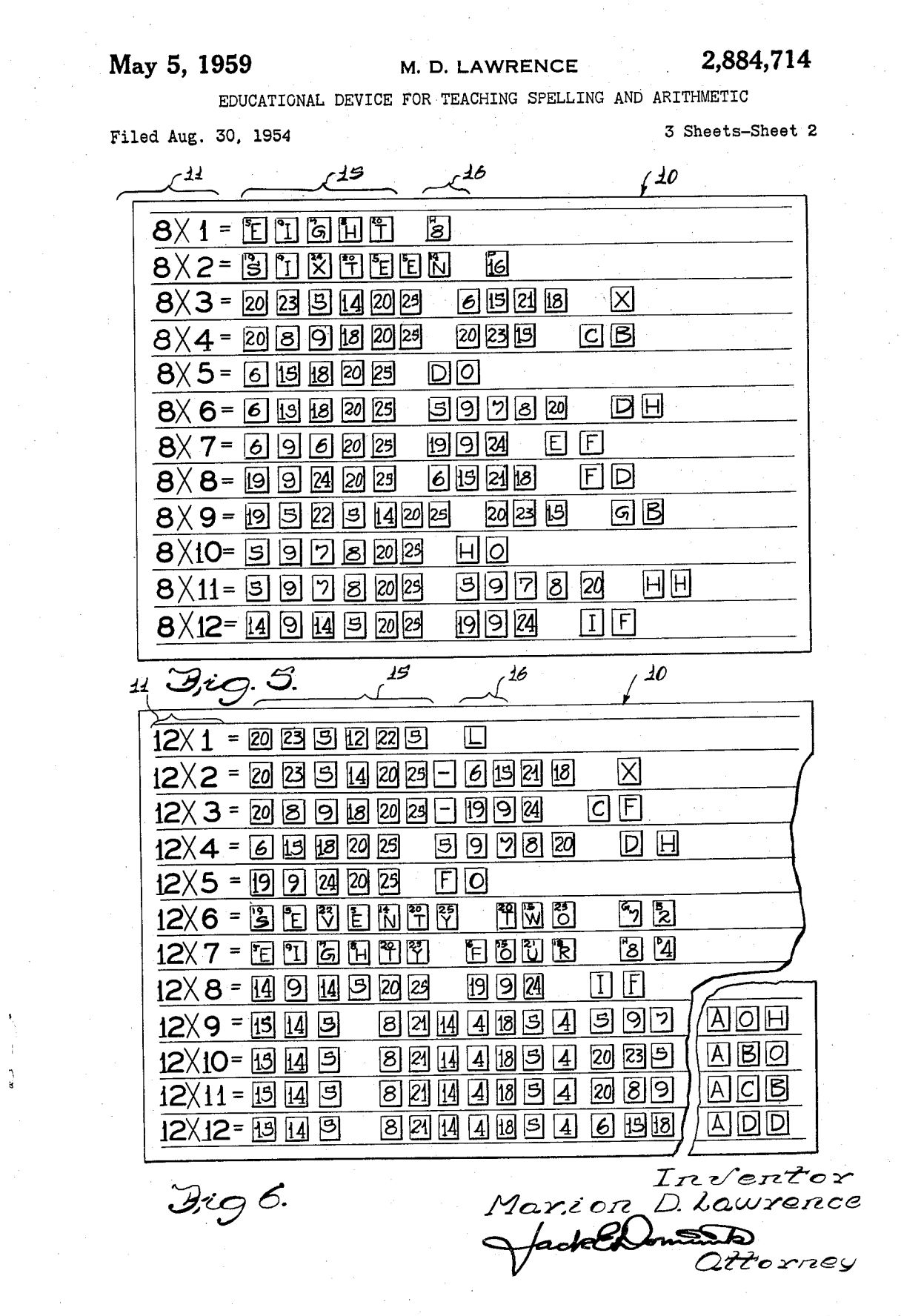

Each of the boards 10, such as those shown in Figs. 4, 5 and 6, sets forth the multiplication table for a particular number with multipliers from 1 through 12. Should it be found desirable to teach the multiplication tables of 13, 14 and 15, the indicia on the boards 10 may be extended to the extent desired.

Referring now specifically to Fig. 4, it will be seen that each card has in common a problem column 11. Each such problem column contains the number of the multiplication table 12 and a multiplier 14. This arrangement, it will be noted, is common to all of the multiplication tables illustrated in Figs. 4, 5 and 6.

Following the problem in a horizontal line (see Fig. 4) are two answer stations: the spelled answer station 15 and the numerical answer station 16.

Two sets of playing blocks or squares are employed by the person playing the game, the lettered blocks 21 and the numbered blocks 18. The numbered blocks 18 are shown in Fig. 2. There it will be seen that the arabic numerals play the prominent role as the printed indicia on the square or block 19. In the upper left hand corner of each of the numerical blocks 19 a letter key 20 appears. For example, in the No. 1 block the letter key is the letter "A." In the numbered block "4," the lettered key is the letter "D."

The lettered blocks 21 are shown in Fig. 3. In the lettered blocks 21 the letter 22 plays the predominant role in the printed indicia, with a numerical key 24 in the upper left hand corner. A random mixture of the lettered blocks 21 and the numbered blocks 19 have been shown on Fig. 1 as they are used by one playing the game.

In order that the child not only learn how to use the multiplication tables, and spell the numbers, but in addition begin to understand the relative position of letters in the alphabet, each of the lettered blocks 21, such as shown in Fig. 3, has the numbered indicia 24 corresponding to the position of its associated letter in the alphabet. For example, the letter "E" carries the indicia "5," since "E" the fifth number in the alphabet. Similarly the letter "T" carries the numbered indicia "20" since T is the twentieth letter in the alphabet.

Referring now to Fig. 2, it will be seen that the same relationship of the indicia of the keys have been applied to the number blocks 19. For example, the number "3" carries as its letter key the letter "C" which is the third letter of the alphabet.

The educational value of the present invention will be most fully appreciated by actually playing the game. The child begins by selecting one of the playing boards 10 and then scattering the numbered blocks 18 and lettered blocks 21 at random either on a nearby flat surface or on a portion of the board 10. The learning process begins right at the point when the child, in order to speed up his playing of the game, separates the numbered block 18 from the lettered blocks 21. He can be further urged to increase his speed by classifying the two individual groups of numbered and lettered blocks by arranging the component blocks serially. The lettered blocks can be arranged alphabetically, the indicia at their upper portion then running numerically 1 through 26. Similarly, the numbered blocks can be arranged serially with the lettered indicia spelling the alphabet.

Referring now to the object identification and spelling board illustrated in Fig. 1, it will be seen that the child begins completing it by placing the lettered blocks 21 over the numbered stations 15 to answer each item. In the first line, when completed, the child sees a picture of a chick and then reads, "IS SPELLED CHICK." The same process follows with the subsequent spelling of "BUNNY," "PIG," and "ROOSTER." The spelling boards will teach the child the alphabet, simple spellings, and number recognition. He then becomes ready to progress to the various mathematical boards. No doubt he would first begin with addition and subtraction boards such as illustrated in Figs. 8 and 9 respectively, but for purposes of completeness the description will treat the multiplication boards first.

In Fig. 4, the multiplication table of 3 is shown with the first two multiplications worked out. In line one it will be seen that the multiplication problem is 3 times 1, the answer to which is 3. The numbered squares in the first station beyond the problem have the sequentially appearing numbers 20, 8, 18, 5, and 5. The letters having these numbers as indicia spell out T–H–R–E–E. Then the child covers the lettered station bearing the letter "C" and finds the answer to his problem as the arabic numeral 3 which is the product of 3 times 1. Similarly, the second line shows the multiplication 3 times 2. The numbered stations following are 19, 9, and 24. When the lettered blocks are placed over these stations they spell S–I–X. The answer to the multiplication appears when the lettered station "F" is covered showing the number 6.

Referring now to Figs. 5 and 6, it will be seen that the very same numbered and lettered blocks are adaptable for use with the higher multiplication tables as well. Fig. 5 shows the multiplication tables of 8. As will be seen the first two lines have been worked out spelling the products of 8 times 1 and 8 times 2, which are respectively E–I–G–H–T and S–I–X–T–E–E–N.

Fig. 5 carries the multiplication table of 12. There the sixth and seventh lines are the multiplication of 12 times 6 and 12 times 7, the products of which 72 and 84 respectively. The answers are spelled out and also appear numerically. The final line in Fig. 5 is the multiplication of 12 times 12. The lettered station at the right shows letters A–D–D, which when covered with their respective number blocks present the number 144. It will be noted that because of space limitation the entire length of the numbered stations following the last four multiplications of 12 tables have not been illustrated.

The division, addition, and subtraction series are illustrated in Figs. 7, 8, and 9 respectively. With the foregoing description of the multiplication tables in mind it will be seen that the division series, such as illustrated partially in Fig. 7, follows the same pattern. One column in the problem column bears the number of the series, and the other the various digits related to the series. Fig. 7 illustrates division by 2, with the answers spelled out for the first three problems and also the numerical answer shown.

Addition series are illustrated in Fig. 8, and particularly the additions to the number "4." In Fig. 8 the number designating the series appears in the first portion of the problem column, but this is not essential. As in the case of multiplication and division, the answers are spelled out and shown in numerical form by the lettered blocks 19 and numbered blocks 21 respectively.

The subtraction series for the number "12" has been illustrated in Fig. 9. Again as in the case of addition, the number designating the series has appeared first in the problem column. The answers, as with the other mathematical series, are both spelled by the numbered blocks 19 and appear in numerical form shown by the numbered blocks 21.

It will be appreciated that various retaining means for the numbered and lettered blocks may be employed on the boards 10. For example recessed squares could be provided into which the numbered and lettered blocks would fit. Also various external configurations for the blocks may be keyed into the numbered stations. It is also contemplated that large sized boards, for classroom usage, may be provided with small number and letter block rails as a horizontal line extending beneath each of the multiplication tables.

One of the advantages of the educational device is that it can be used by the individual child, or played as a group game. In the latter case the group would have similar boards, and draw from piles of lettered and numbered blocks turned face down. Scoring can be based on the number of words or problems completed, or on a basis of the first board completed, or in a variation of methods depending upon the nature of the group.

Although the particular embodiment of the present invention has been shown and described in some detail here, there is no intention to thereby limit the invention to the details of such an embodiment. On the contrary, the intention is to cover all modifications, alternative embodiments, usages and equivalents of the educational device as fall within the spirit and scope of the invention as expressed and defined in the specification and the appended claims.

I claim as my invention:

1. An educational device comprising, in combination; a plurality of problem cards for arithmetical series, each such card being characterized by three columns of printed indicia, each such card presenting a uniformly flat surface, the first column containing printed indicia of a mathematical series, each problem in the series arranged sequentially, a plurality of horizontally oriented numbered squares in the second column, a plurality of horizontally oriented lettered squares in the third column, a plurality of letter blocks with smaller key numbers in one corner thereof, each such letter block being uniformly rectangular in configuration, a plurality of number blocks with key letters in a corner thereof, each such number block having a uniform rectangular configuration and being congruent with the letter blocks, the numbered squares in the second column corresponding sequentially to the key number on the letter blocks which spell the answer to the arithmetical problem, and the lettered squares in the third column when keyed with the number blocks having key letters showing the answer in the numbered form.

2. An educational device comprising, in combination; a plurality of problem cards for arithmetical series, each such card being characterized by three columns of printed indicia, each such card presenting a uniformly flat surface, the first column containing printed indicia of a mathematical series, each problem in the series arranged sequentially, a plurality of horizontally oriented numbered squares in the second column, a plurality of horizontally oriented lettered squares in the third column, a plurality of letter blocks with smaller key numbers in one corner thereof, each such letter block being uniformly rectangular in configuration, a plurality of number blocks with key letters in a corner thereof, each such number block having a uniform rectangular configuration and being congruent with the letter blocks, the numbered squares in the second column corresponding sequentially to the key number on the letter blocks which spell the answer to the arithmetical problem, and the lettered squares in the third column when keyed with the number blocks having key letters showing the answer in the numbered form, the key for each of the lettered blocks being the number denoting the numerical appearance of that letter in the alphabet.

3. An educational device comprising, in combination; a plurality of problem cards for arithmetical series, each such card being characterized by three columns of printed indicia, each such card presenting a uniformly flat surface, the first column containing printed indicia of a mathematical series, each problem in the series arranged sequentially, a plurality of horizontally oriented numbered squares in the second column, a plurality of horizontally oriented lettered squares in the third column, a plurality of letter blocks with smaller key numbers in one corner thereof, each such letter block being uniformly rectangular in configuration, a plurality of number blocks with key letters in a corner thereof, each such number block having a uniform rectangular configuration and being congruent with the letter blocks, the numbered squares in the second column corresponding sequentially to the key number on the letter blocks which spell the answer to the arithmetical problem, and the lettered squares in the third column when keyed with the number blocks having key letters showing the answer in the numbered form, the key for each of the lettered blocks being the number denoting the numerical appearance of that letter in the alphabet, and the key for each of the numbered blocks being the letter of the alphabet corresponding to the block's number in the sequential appearance of such letter in the alphabet.

References Cited in the file of this patent

UNITED STATES PATENTS

| | | |
|---|---|---|
| 1,273,763 | Garman | July 23, 1918 |
| 1,359,646 | Zion | Nov. 23, 1920 |
| 1,428,456 | Stranders | Sept. 5, 1922 |
| 1,542,031 | Bruhn | June 16, 1925 |
| 1,571,488 | Moisan et al. | Feb. 2, 1926 |
| 1,572,433 | Jones | Feb. 9, 1926 |
| 2,361,154 | Schoolfield | Oct. 24, 1944 |